United States Patent
Chou

(10) Patent No.: US 9,521,576 B2
(45) Date of Patent: Dec. 13, 2016

(54) SYSTEM AND METHOD OF PERFORMANCE MEASUREMENTS FOR WIRELESS LOCAL AREA NETWORK ACCESS POINTS

(71) Applicant: Intel IP Corporation, Santa Clara, CA (US)

(72) Inventor: Joey Chou, Scottsdale, AZ (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/575,870

(22) Filed: Dec. 18, 2014

(65) Prior Publication Data

US 2015/0312795 A1    Oct. 29, 2015

Related U.S. Application Data

(60) Provisional application No. 61/985,394, filed on Apr. 28, 2014.

(51) Int. Cl.
*G06Q 40/00* (2012.01)
*G07D 11/00* (2006.01)
(Continued)

(52) U.S. Cl.
CPC ......... *H04W 28/0236* (2013.01); *H04W 24/02* (2013.01); *H04W 24/08* (2013.01); *H04W 84/12* (2013.01)

(58) Field of Classification Search
CPC ............... H04L 12/26; H04L 1/00; H04J 3/14; H04J 1/16; G08C 15/00; G01R 31/08; G06K 11/00; G06K 19/00; G06Q 40/00; G07F 19/00; G07F 17/00; G07D 11/00
(Continued)

(56) References Cited

U.S. PATENT DOCUMENTS 8,228,861 B1 *    7/2012   Nix .................. H04W 36/00 370/329
2007/0263575 A1 * 11/2007   Choe ........................... 370/338
(Continued)

FOREIGN PATENT DOCUMENTS

WO        2013/147567 A1    10/2013

OTHER PUBLICATIONS

3GPP, "Telecommunication management; Performance Management (PM); Performance measurements Wireless Local Area Network (WLAN) (Release 12)," 3GPP TS 28.403 V0.0.0 (Nov. 2013), Jan. 14, 2014, Lte Advanced, 10 pages.
(Continued)

*Primary Examiner* — Edwyn Labaze
(74) *Attorney, Agent, or Firm* — Schwabe, Williamson & Wyatt, P.C.

(57) ABSTRACT

Embodiments described herein relate generally to a communication between an element manager and a wireless local area network (WLAN) access point (AP). The WLAN AP may be configured with one or more counters. The one or more counters may measure events, such as data transmission and/or reception at the WLAN AP or statistics based on association of user equipment (UE) with the WLAN AP. The element manager may be configured to read one or more of these counters and compute one or more values based on the values read from the one or more counters. The element manager may be configured to communicate the one or more computed values to a network manager. Other embodiments may be described and/or claimed.

23 Claims, 8 Drawing Sheets

(51) Int. Cl.
*G07F 19/00* (2006.01)
*H04W 28/02* (2009.01)
*H04W 24/02* (2009.01)
*H04W 24/08* (2009.01)
*H04W 84/12* (2009.01)

(58) Field of Classification Search
USPC ........ 235/379, 375, 487, 874; 370/242, 258, 370/332, 338
See application file for complete search history.

(56) References Cited

U.S. PATENT DOCUMENTS

| | | | |
|---|---|---|---|
| 2008/0294418 | A1 | 11/2008 | Cleary et al. |
| 2010/0110918 | A1 | 5/2010 | Mihaly et al. |
| 2011/0085447 | A1* | 4/2011 | Kholaif .................. H04W 12/04 370/242 |
| 2012/0023205 | A1 | 1/2012 | Hu et al. |
| 2012/0230214 | A1 | 9/2012 | Kozisek et al. |
| 2012/0281563 | A1* | 11/2012 | Comsa .................. H04W 24/10 370/252 |
| 2013/0028080 | A1 | 1/2013 | Rao et al. |
| 2013/0066771 | A1* | 3/2013 | Ciurea ................ G06Q 30/0201 705/39 |
| 2013/0331079 | A1* | 12/2013 | Racz et al. .................... 455/418 |
| 2014/0092742 | A1 | 4/2014 | Chou |
| 2014/0146763 | A1* | 5/2014 | Khay-Ibbat ....... H04W 28/0268 370/329 |
| 2014/0153415 | A1* | 6/2014 | Choudhury et al. .......... 370/252 |
| 2014/0194110 | A1* | 7/2014 | Suerbaum et al. ........... 455/418 |
| 2014/0211674 | A1* | 7/2014 | Hiremath ...................... 370/311 |
| 2014/0341181 | A1* | 11/2014 | Sarkar et al. ................. 370/331 |
| 2015/0043386 | A1* | 2/2015 | Racz .................... H04L 41/044 370/255 |
| 2015/0071204 | A1* | 3/2015 | Seok ............................ 370/329 |
| 2015/0163767 | A1* | 6/2015 | Shaw .................... H04W 64/00 455/456.1 |
| 2015/0195414 | A1* | 7/2015 | Raleigh ............ G06Q 10/06375 370/252 |

OTHER PUBLICATIONS

3GPP, "Telecommunication management; Study on WLAN Management (Release 12)," 3GPP TR 32.841 V1.4.0 (Apr. 2014), Apr. 23, 2014, Lte Advanced, 13 pages.

International Search Report and Written Opinion mailed Apr. 28, 2015 from International Application No. PCT/US2015/014227.

3GPP, "Technical Specification Group Services and System Aspects; Telecommunication management; Performance Management (PM); Concept and requirements (Release 10)," 3GPP TS 32.401 V10.2.0 (Dec. 2011), Lte Advanced, 29 pages.

Office Action issued Mar. 21, 2016 from Taiwan Patent Application No. 104107576, 13 pages.

* cited by examiner

SYSTEM AND METHOD OF PERFORMANCE MEASUREMENTS FOR WIRELESS LOCAL AREA NETWORK ACCESS POINTS

CROSS REFERENCE TO RELATED APPLICATIONS

This application claims priority under 35 U.S.C. §119(e) to U.S. Provisional Patent Application No. 61/985,394, entitled "System and Method of WLAN AP Performance Measurements" and filed Apr. 28, 2014. The disclosure of this provisional application is incorporated herein by reference.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Wireless local area networks are being examined to complement existing radio access networks. For example, network operators may deploy a plurality of wireless local area network (WLAN) nodes to mitigate traffic congestion caused by a surge of mobile data traffic. As a result, measurements associated with performance of base stations and/or access points may be beneficial to monitor the efficacy of offloading from a radio access network (RAN) to a WLAN. Since mobile data traffic may fluctuate rapidly and/or dynamically, the performance measurements are collected and/or correlated on a regular basis to identify any potential issues that may degrade the offloading performance. In turn, more WLAN nodes may be deployed in an area to improve offloading performance, or fewer WLAN nodes may be deployed.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
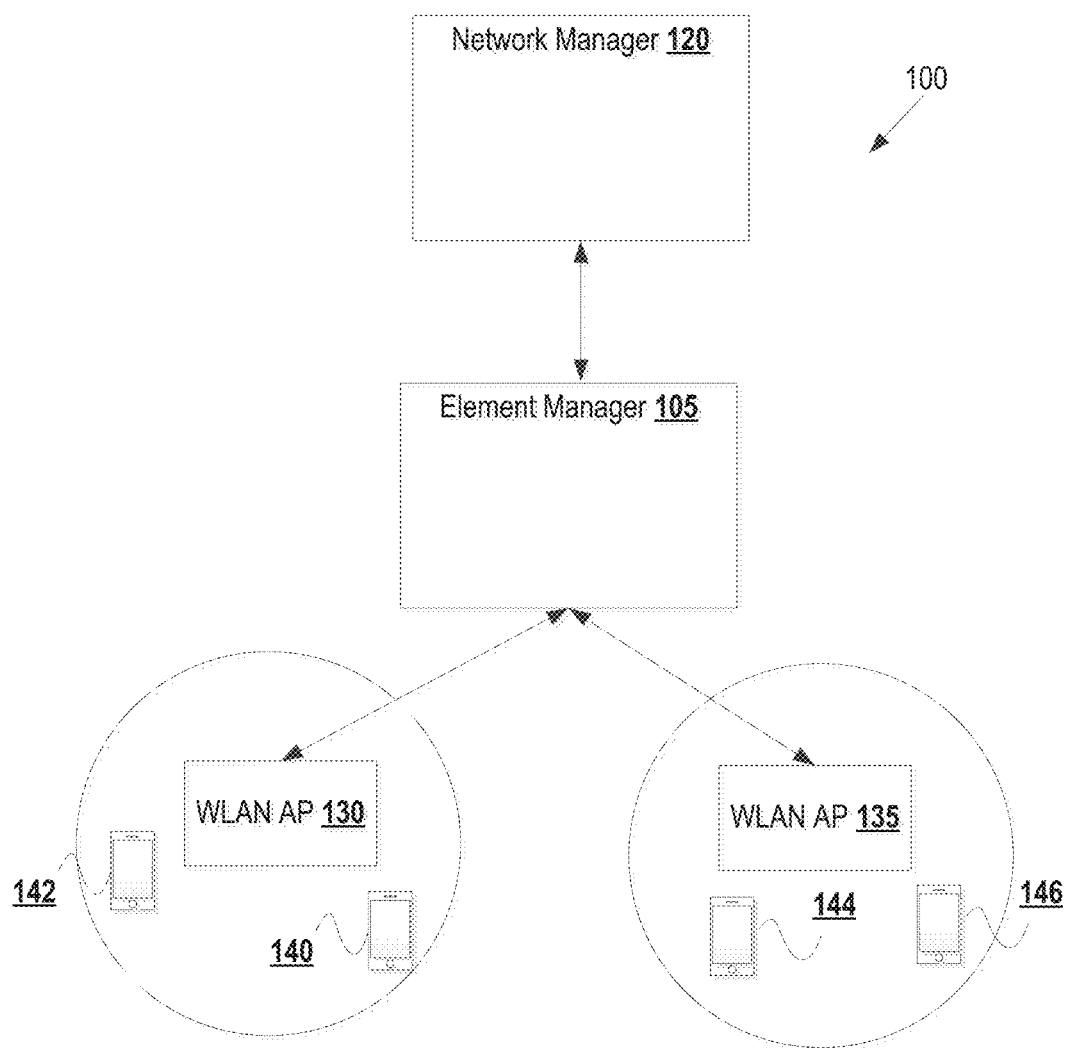
FIG. 1 is a block diagram illustrating an environment in which an element manager is configured to receive measurements associated with one or more WLAN access points, in accordance with various embodiments.

Beginning first with FIG. 1, a block diagram shows an environment 100 in which an element manager 105 is configured to receive measurements associated with one or more WLAN access points (APs) 130-135, in accordance with various embodiments. In various embodiments, the element manager 105 may be a computing system, such as a server. The element manager 105 may be implemented using any combination of hardware and software on any network computing system, such as those shown in FIG. 1 and others that are not shown but are often found in wireless communication networks. Moreover, in various embodiments, one or more of the entities depicted in FIG. 1 may be implemented on the same or different computing systems.

The element manager 105 may be configured to communicate with the WLAN APs 130-135. Each of the WLAN APs 130-135 may be any computing device that allows wireless devices to connect, for example, to a wired network (e.g., a core network) according to one or more $3^{rd}$ Generation Partnership Project (3GPP) technical specifications and/or another similar standard. The WLAN APs 130-135 may be configured to connect the user equipment (UE) 140-146 to a network for communication according to a third Generation (3G), fourth Generation (4G), fifth Generation (5G), or beyond system that adheres to one or more standards, such as Long Term Evolution (LTE), LTE-Advanced (LTE-A), Institute of Electrical and Electronics Engineers (IEEE) 802.11, or another similar standard. In various embodiments, the one or more standards may be promulgated by 3GPP.

In one embodiment, one of the WLAN APs 130-135 may be a femtocell or other low-powered radio access base station. In one embodiment, one of the WLAN APs 130-135 may include and/or be communicatively coupled with a router. In one embodiment, the element manager 105 may be integrated with one or both of the WLAN APs 130-135. In one embodiment, one of the WLAN APs 130-135 may be configured to receive an instruction from an evolved Node B (eNB) so that traffic may be offloaded by the eNB to the one of the WLAN APs 130-135.

Each of the UEs 140-146 may be any type of computing device equipped with broadband circuitry and adapted to operate on a cell according to, for example, 3GPP technical specifications. For example, one or both of the UEs 140-146 may be a netbook, a tablet computer, a handheld computing device, a web-enabled appliance, a gaming device, a mobile phone, a smartphone, an eBook reader, a personal data assistant, or the like. In another embodiment, one or both of the UEs 140-146 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

In various embodiments, traffic associated with the UEs 140-146 may be communicated through the WLAN APs 130-135. Such traffic may be, for example, according to a cellular protocol (e.g., an LTE and/or LTE-A protocol, IEEE 802.11), a wireless protocol, and/or another wireless communication protocol. In embodiments, the WLAN APs 130-135 may be adapted to perform various measurements associated with the UEs 140-146. Such measurements may be defined by one or more groups. In various embodiments, one or more counters for measuring data may be defined by the Internet Engineering Task Force (IETF) and/or the Institute of Electrical and Electronics Engineers (IEEE).

The Interfaces Management Information Database (IF-MIB) in IETF Request for Comments (RFC) 2863 defines a plurality of counters for measuring data on an internet protocol (IP) layer of one of the WLAN APs 130-135. A 32-bit counter may measure a total number of octets received on the IP layer (ifInOctets). Another 32-bit counter may measure a total number of octets transmitted on the IP layer (ifOutOctets). A 64-bit counter may measure a total number octets received on the IP layer (ifHCInOctets). Another 64-bit counter may measure a total number of octets transmitted on the IP layer (ifHCOutOctets). A counter may measure a number of packets that one or more higher-level protocols requested be transmitted (ifHCOutUcastPkts). Another counter may measure a number of packets delivered by the IP layer to a higher layer (ifHCInUcastPkts).

Similarly, a specification promulgated by IEEE may define a plurality of counters. The IEEE 802.11 provides a Management Information Database (IEEE802dot11-MIB) that defines counters for measuring data volume on a media access control (MAC) control layer of one of the WLAN APs 130-135. A first counter may measure a number of successfully received MAC protocol data units (MPDUs) of type data or management. A second counter may measure a number of transmitted MPDUs of type data or management that have been acknowledged. The IEEE802dot11-MIB may additionally define counters for measuring a number of UEs that are associated with and/or are denied association with a WLAN AP. Accordingly, a third counter may measure a number of UEs 140-146 associated (which may include re-association by a UE) with one of the WLAN APs 130-135 (dot11AssociatedStationCount). A fourth counter may measure a number of UEs 140-146 that are denied association with one of the WLAN APs 130-135, for example, due to load on the one of the WLAN APs 130-135 (dot11DeniedAssociationCounterDueToBSSLoad).

The WLAN APs 130-135 may be configured to increment, decrement, and/or otherwise modify a respective value of one or more of these counters based on the UEs 140-146. For example, a first WLAN AP 130 would increment its dot11AssociatedStationCount for each of the UEs 140-142 that associate with the WLAN AP 130. Correspondingly, the first WLAN AP 130 would decrement its dot11AssociatedStationCount if one of the UEs 140-142 were to un-associate with the first WLAN AP 130.

In various embodiments, one or more of the counters maintained at the WLAN APs 130-135 may increment based on traffic at the WLAN AP 130. As traffic to and from the UEs 140-146 is transmitted and received at the MAC and IP layers of the WLAN APs 130-135, the WLAN APs 130-135 may increment the respective corresponding counter. In some embodiments, one or more of the counters may continuously increment. For example, ifOutOctets and ifInOctets may continuously increment by one (1) when each octet is transmitted and received, respectively, and would wrap around to zero (0) when a limit of the counter is reached.

In embodiments, the element manager 105 may be adapted to read one or more of the counters of the WLAN APs 130-135. For example, the element manager 105 may be adapted to transmit a request to one of the WLAN APs 130-135 for one or more values of one or more counters. Based on the request, the one of the WLAN APs 130-135 may return the one or more requested values of the one or more counters. The element manager 105 may be adapted to store these values and/or compute other values based on the counter values.

In one embodiment, the element manager 105 may be configured to transmit values to a network manager 220. In various embodiments, the network manager 220 may be a computing system, such as a server. The network manager 220 may be implemented using any combination of hardware and software on any network computing system, such as those shown in FIG. 2 and others that are not shown but are often found in wireless communication networks. Moreover, in various embodiments, one or more of the entities depicted in FIG. 2 may be implemented on the same or different computing systems.

Figure 2:
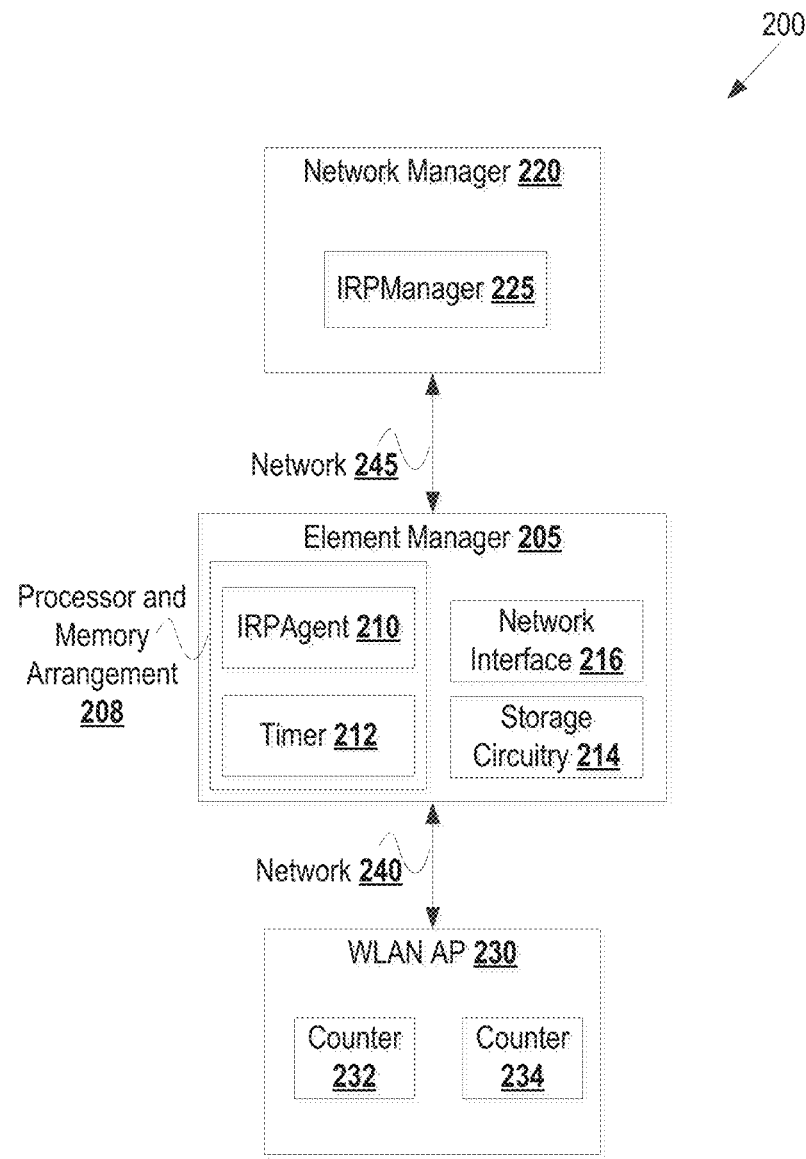
FIG. 2 is a block diagram illustrating an environment in which an element manager is to read one or more values of one or more counters at a WLAN AP and send computed values to a network manager based on the counter values, in accordance with various embodiments.

With respect to FIG. 2, a block diagram illustrates an environment 200 in which an element manager 205 is to read one or more values of one or more counters 232-234 at a WLAN AP 230 and send computed values to a network manager based on the counter values, in accordance with various embodiments. The element manager 205 may be an embodiment of the element manager 105, the network manager 220 may be an embodiment of the network manager 120, and the WLAN AP 230 may be an embodiment of one of the WLAN APs 130-135, as illustrated in FIG. 1.

The network manager 220 may include an integration reference point manager (IRPManager) 225. The IRPManager 225 may be configured to manage the WLAN AP 230, such as by sending and/or receiving management data to and/or from the element manager 205 over a Type-2 interface. The IRPManager 225 may be configured to receive one or more values from the element manager 205.

One of more of the network manager 220, the element manager 205, and/or the WLAN AP 230 may be controlled and/or managed by a network operator (e.g., a cellular operator). To enable WLAN to complement a network of an operator (e.g., a cellular network), measurements associated with the performance of the WLAN AP 230 may be helpful to the operator. Further, measurements associated with the performance of the WLAN AP 230 may allow the quality of service experienced by users to be monitored. As described herein, one or more counters may measure values associated with performance. For example, data volume and/or statistics of UE association, re-association, and/or denial of association may be measured to reflect performance of the WLAN AP 230. In some embodiments, the counters 232-234 may be any of ifInOctets, ifOutOctets, ifHCInOctets, ifHCOutOctets, ifHCOoutUcastPkts, ifHCInUcastPkts, dot11ReceivedFragmentCount, dot11TransmittedFragmentCount, dot11AssociatedStationCount, and/or dot11DeniedAssociationCounterDuetoBSSLoad. In another embodiment, one or both of the counters 232-234 may be another counter that is incremented, decremented, and/or otherwise modified based on UE traffic and/or UE association and/or denial thereof.

The element manager 205 may include a processor and memory arrangement 208. The processor and memory arrangement 208 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth.

The processor and memory arrangement 208 may be communicatively coupled with storage circuitry 214. Storage circuitry 214 may include one or more machine- (e.g., computer-) readable storage media, such as read only memory (ROM), random access memory (RAM), magnetic disk storage media, optical storage media, and/or flash memory devices. The storage circuitry 214 may be configured to store one or more values in one or more data structures.

Additionally, the processor and memory arrangement 208 may be communicatively coupled with a network interface 216. The network interface 216 may include circuitry adapted to transmit and/or receive signals over a network (e.g., transmitter circuitry and/or receiver circuitry). The network interface 216 may be configured to communicate signals across various types of wired and/or wireless networks, such as a radio network, a WLAN, a fiber optic network, and/or other networks. Accordingly, the networks 240-245 are intended to represent a broad range of networks known in the art. Examples of networks 240-245 may include wired or wireless, local or wide area, private or public networks, including the Internet.

The processor and memory arrangement 208 may have loaded therein an integration reference point agent (IRPAgent) 210 and a timer 212. In some embodiments, the IRPAgent 210 may include the timer 212. In one embodiment, the IRPAgent 210 may cause the network interface 216 to communicate data over the networks 240-245 according to various approaches. For example, the IRPAgent 210 may cause data to be transmitted to and/or received from the WLAN AP 230 over the network 240 according to a simple network management protocol (SNMP). The IRPAgent 210 may cause data to be transmitted to and/or received from the network manager 220 over the network 245 via an Itf-N Type-2 Interface.

The IRPAgent 210 may be configured to read one or more counters 232-234. In various embodiments, the IRPAgent 210 may be configured to cause the network interface 216 to transmit a request over the network 240 for one or more values of one or more counters 232-234. In response to the request, the network interface 216 may receive, over the network 240, one or more values of the one or more counters 232-234. In various embodiments, the IRPAgent 210 may forward a value read from one of the counters 232-234 (e.g., values of the 64-bit counters ifHCInOctets and ifHCOutOctets may be forwarded by the IRPAgent 210 to the IRPManager 225).

In some embodiments, the IRPAgent 210 may read one or more of the counters 232-234 after a granularity period, which may be a predetermined period of time. The IRPAgent 210 may be configured to begin the timer 212 to measure the granularity period. After the timer 212 has elapsed, the IRPAgent 210 may read one or more of the counters 232-234. The IRPAgent 210 may be configured to store a value read from one or more of the counters 232-234 in the storage circuitry 214, such as in a data structure.

In various embodiments, the IRPAgent 210 may be configured to store a plurality of values read from one or more of the counters 232-234, e.g., the IRPAgent 210 may store a previous value read from one of the counters 232-234 as well as a most-recent value read from the one of the counters 232-234. In some embodiments, the IRPAgent 210 may compute another value based on a plurality of values from one of the counters 232-234, e.g., the IRPAgent 210 may compute the other value based on a comparison of a most-recent value and a previous value from one of the counters 232-234.

In embodiments, the IRPAgent 210 may be configured to transmit stored values to the IRPManager 225 at the network manager 220. In various embodiments, the IRPAgent 210 may store and compute values associated with data volume through a cumulative counter approach. In the cumulative counter approach, the IRPAgent 210 may store a running count of the event that is being counted (e.g., transmission or reception by the WLAN AP 230 at the MAC or IP layer) during a granularity period, such as the duration of the timer 212.

For some embodiments where a first counter 232 is a data volume counter described herein, the first counter 232 may continuously increment by one (1) when an octet or a packet is transmitted or received and would return (e.g., wrap around) to zero (0) when the counter reaches its limit. Therefore, when the IRPAgent 210 reads the first counter 232 when the timer 212 has elapsed, the first counter 232 may not reflect a value of the number of octets or packets that have been transmitted or received during the granularity period but would reflect a total value since the first counter 232 was first initialized to zero or last wrapped around. To address this, the IRPAgent 210 may be configured to compare a most-recent value and a previous value from the first counter 232 and compute a data volume value based on the comparison.

In some embodiments, a plurality of counters 232-234 may be associated with data volume and, therefore, the IRPAgent 210 may compute a plurality of data volume values (e.g., a first data volume value based on dot11ReceivedFragmentCount and a second data volume value based on ifHCOutOctets).

After the data volume value is computed, the IRPAgent 210 may be configured to send the data volume value to the IRPManager 225 at the network manager 220. The IRPAgent 210 may then clear the one or more data structures that are to store the most-recent value of the first counter 232 and/or previous value of the first counter 232 or may overwrite those values of the first counter 232 in the one or more data structures based on subsequent readings of the first counter 232 at a next granularity period.

In various embodiments, the IRPAgent 210 may be configured to store and/or compute one or more values through a status inspection approach. In a status inspection approach, the IRPAgent 210 may store status inspection values (e.g., a mean value, a maximum value, etc.) for resource management purposes. The IRPAgent 210 may read one or more of the counters 232-234 a predetermined plurality of times (e.g., the duration of the timer 212) during a granularity period, which may be based upon an expected rate of change of one or more of the status inspection values. Thus, a granularity period for status inspection may be approximately a multiple of the duration of the timer 212. The value of the one of the counters 232-234 may then be stored in a data structure in the storage circuitry 214. A status inspection value may be reset (e.g., to zero) at the beginning of the granularity period and may have a valid result at the end of the granularity period.

In embodiments, the IRPAgent 210 may be configured to read, via status inspection, a second counter 234 that is for measuring a sample that indicates the number of UEs that are associated with and/or are denied association with the WLAN AP 230—e.g., the second counter 234 may be dot11AssociatedStationCount or dot11DeniedAssociationCounterDueToBSSLoad. The IRPAgent 210 may be adapted to store, in one or more data structures in the storage circuitry 214, a plurality of values based on a plurality of readings of the second counter 234. From the stored plurality of values, the IRPAgent 210 may be configured to compute one or more status inspection values, such as a mean value, a maximum value, and/or another similar value over a granularity period. For example, the mean value may reflect an average number of UEs that are associated with (or denied association with) the WLAN AP 230 over a granularity period (e.g., a predetermined multiple of the timer 212), while the maximum value may reflect the largest number of UEs that are associated with (or denied association with) the WLAN AP 230 during that granularity period.

After the granularity period, the IRPAgent 210 may be configured to send one or more computed values (e.g., the mean value and/or maximum value) to the IRPManager 225 at the network manager 220. The IRPAgent 210 may then clear the one or more data structures that are to store the values or may overwrite those values in the one or more data structures based on subsequent readings of the second counter 234 during a next predetermined number of granularity periods.

One of the counters 232-234 may be ifInOctets, ifOutOctets, ifHCInOctets, ifHCOutOctets, ifHCOoutUcastPkts, ifHCInUcastPkts, dot11ReceivedFragmentCount, dot11TransmittedFragmentCount, dot11AssociatedStationCount, or dot11DeniedAssociationCounterDuetoBSSLoad. As described herein, the IRPAgent 210 may read one or more of the counters 232-234 to compute a data volume value and/or a status inspection value, such as a mean value, a maximum value, and/or another measurement value.

These computed values may be performance measurements used and collected by the IRPAgent 210 and/or the IRPManager 225 for management of the WLAN AP 230 (and other network management operations).

In various embodiments, the data volume values may be used to measure the number of packets or octets per elapsed time on a WLAN air interface, including incoming and outgoing packets and octets at the MAC or IP layer. The data volume values may provide an indication on how much UE traffic is carried over the WLAN. Relatively low data volume values may indicate potential problems with the WLAN AP 230 that prevent UEs from transmitting and/or receiving data. However, relatively high data volume values may indicate additional WLAN APs may be beneficial to facilitate UE traffic.

In various embodiments, the status inspections values, such as those values based on UE-association related measurements (e.g., mean and maximum values of associated UEs or failed associations) may provide statistics of a mean number and maximum number of UEs that successfully or fail to successfully associate with the WLAN AP 230. In embodiments, a UE is associated with the WLAN AP 230 when the UE has passed an authentication process and is able to gain access to the WLAN. Association allows the WLAN AP 230 to record each UE so that frames may be received from or transmitted to a UE. These measurements may indicate performance and/or potential issues with the WLAN AP 230. For example, a lower mean value of associated UEs, and relatively higher mean value of UEs that failed to associate with the WLAN AP 230 may indicate that the WLAN AP 230 has an issue with an association (or re-association) function.

A computed value may be a single integer. In some embodiments, one or more of the computed values may be uniquely identified, for example, so that the IRPAgent 210 may specify the computed value to the IRPManager 225. The computed values may be of class type WLANManagementFunction. Further, these computed values may be applicable to packet-switched domains. These computed values may be applicable to combined Global System for Mobile Communications (GSM), Universal Mobile Telecommunications System (UMTS) and/or Evolved Packet System (EPS) systems, regardless of whether the measured event occurred on the GSM, UMTS, or EPS part of the system (e.g., for ifHCInUcastPkts, only one total (e.g., GSM, UMTS, and/or EPS) count is obtained for the measured event).

According to embodiments, a first data volume value may be a number of incoming IP packets received at the WLAN AP 230 based on ifHCInUcastPkts. The IRPAgent 210 may calculate this data volume value based on the cumulative counter approach by reading ifHCInUcastPkts. The IRPAgent 210 may read the value of ifHCInUcastPkts at the beginning and end of each granularity period and calculate a difference between those two values as the data volume value. However, the IRPAgent 210 may account for the wrapping around of the ifHCInUcastPkts—e.g., if the ending value is less than the beginning value, then the IRPAgent 210 may calculate the data volume value as the difference between the size of ifHCInUcastPkts and the beginning value plus the ending value. This data volume value may be uniquely identified by the identifier IP.InPacketWlanAP.

According to embodiments, a second data volume value may be a number of outgoing IP packets transmitted by the WLAN AP 230 based on ifHCOutUcastPkts. The IRPAgent 210 may calculate this data volume value based on the cumulative counter approach by reading ifHCOutUcastPkts. The IRPAgent 210 may read the value of ifHCOutUcastPkts at the beginning and end of each granularity period and calculate a difference between those two values as the data volume value. However, the IRPAgent 210 may account for the wrapping around of the ifHCOutUcastPkts—e.g., if the ending value is less than the beginning value, then the IRPAgent 210 may calculate the data volume value as the difference between the size of ifHCOutUcastPkts and the beginning value plus the ending value. This data volume value may be uniquely identified by the identifier IP.OutPacketWlanAP.

According to embodiments, a third data volume value may be a number of octets of incoming IP packets that are received by the WLAN AP 230 based on ifHCInOctets. The IRPAgent 210 may calculate a data volume value based on the cumulative counter approach by reading ifHCInOctets. The IRPAgent 210 may read the value of ifHCInOctets at the beginning and end of each granularity period and calculate a difference between those two values as the data volume value. However, the IRPAgent 210 may account for the wrapping around of the ifHCInOctets—e.g., if the ending value is less than the beginning value, then the IRPAgent 210 may calculate the data volume value as the difference between the size of ifHCInOctets and the beginning value plus the ending value. This data volume value may be uniquely identified by the identifier IP.InOctetWlanAP.

According to embodiments, a fourth data volume value may be the number of octets of outgoing IP packets that are transmitted by WLAN AP 230 based on ifHCOutOctets. The IRPAgent 210 may calculate a data volume value based on the cumulative counter approach by reading ifHCOutOctets. The IRPAgent 210 may read the value of ifHCOutOctets at the beginning and end of each granularity period and calculate a difference between those two values as the data volume value. However, the IRPAgent 210 may account for the wrapping around of the ifHCOutOctets—e.g., if the ending value is less than the beginning value, then the IRPAgent 210 may calculate the data volume value as the difference between the size of ifHCOutOctets and the beginning value plus the ending value. This data volume value may be uniquely identified by the identifier IP.OutOctetWlanAP.

According to embodiments, a fifth data volume value may be the number of incoming MPDUs that are successfully received by the WLAN AP 230 based on dot11ReceivedFragmentCount. The IRPAgent 210 may calculate a data volume value based on the cumulative counter approach by reading dot11ReceivedFragmentCount. The IRPAgent 210 may read the value of dot11ReceivedFragmentCount at the beginning and end of each granularity period and calculate a difference between those two values as the data volume value. However, the IRPAgent 210 may account for the wrapping around of the dot11ReceivedFragmentCount—e.g., if the ending value is less than the beginning value, then the IRPAgent 210 may calculate the data volume value as the difference between the size of dot11ReceivedFragmentCount and the beginning value plus the ending value. This data volume value may be uniquely identified by the identifier MAC.InMpduWlanAp.

According to embodiments, a sixth data volume value may be the number of outgoing MPDUs that are successfully transmitted (e.g., acknowledged) by the WLAN AP 230 based on dot11ReceivedTransmittedFragmentCount. The IRPAgent 210 may calculate a data volume value based on the cumulative counter approach by reading dot11ReceivedTransmittedFragmentCount. The IRPAgent 210 may read the value of dot11ReceivedTransmittedFragmentCount at the beginning and end of each granularity period and calculate a difference between those two values as the data volume value. However, the IRPAgent 210 may account for the wrapping around of the dot11ReceivedTransmittedFragmentCount—e.g., if the ending value is less than the beginning value, then the IRPAgent 210 may calculate the data volume value as the difference between the size of dot11ReceivedTransmittedFragmentCount and the beginning value plus the ending value. This data volume value may be uniquely identified by the identifier MAC.OutMpduWlanAp.

According to embodiments, a mean number of associated UE may be computed based on dot11AssociatedStationCount at the WLAN AP 230. The IRPAgent 210 may compute the mean value based on the status inspection approach by reading dot11AssociatedStationCount. The IRPAgent 210 may calculate a mean value by first reading dot11AssociatedStationCount at a predetermined interval (e.g., based on the timer 212) and then calculating the arithmetic mean of all values at the end of a predetermined plurality of predetermined intervals (e.g., a granularity period). The mean value may be uniquely identified by the identifier UE.AssociatedUeNumMean.

According to embodiments, a maximum number of associated UEs may be computed based on dot11AssociatedStationCount at the WLAN AP 230. The IRPAgent 210 may compute the maximum value based on the status inspection approach by reading dot11AssociatedStationCount. The IRPAgent 210 may calculate a maximum value by first reading dot11AssociatedStationCount at a predetermined interval (e.g., based on the timer 212) and then determining the maximum value of all values at the end of a predetermined plurality of predetermined intervals (e.g., a granularity period). The maximum value may be uniquely identified by the identifier UE.AssociatedUeNumMax.

According to embodiments, a mean number of failed associations (and/or failed re-associations) by UEs may be computed based on dot11DeniedAssociationCounterDueToBSSLoad at the WLAN AP 230. The IRPAgent 210 may compute the mean value based on the status inspection approach by reading dot11DeniedAssociationCounterDueToBSSLoad. The IRPAgent 210 may calculate a mean value by first reading dot11DeniedAssociationCounterDueToBSSLoad at a predetermined interval (e.g., based on the timer 212) and then calculating the arithmetic mean of all values at the end of a predetermined plurality of predetermined intervals (e.g., a granularity period). The mean value may be uniquely identified by the identifier MAC.FailAssocUeMean.

According to embodiments, a maximum number of failed associations (and/or failed re-associations) by UEs may be computed based on dot11DeniedAssociationCounterDueToBSSLoad at the WLAN AP 230. The IRPAgent 210 may compute the mean value based on the status inspection approach by reading dot11DeniedAssociationCounterDueToBSSLoad. The IRPAgent 210 may calculate a maximum value by first reading dot11DeniedAssociationCounterDueToBSSLoad at a predetermined interval (e.g., based on the timer 212) and then determining the maximum value of all values at the end of a predetermined plurality of predetermined intervals (e.g., a granularity period). The maximum value may be uniquely identified by the identifier MAC.FailAssocUeMax.

Figure 3:
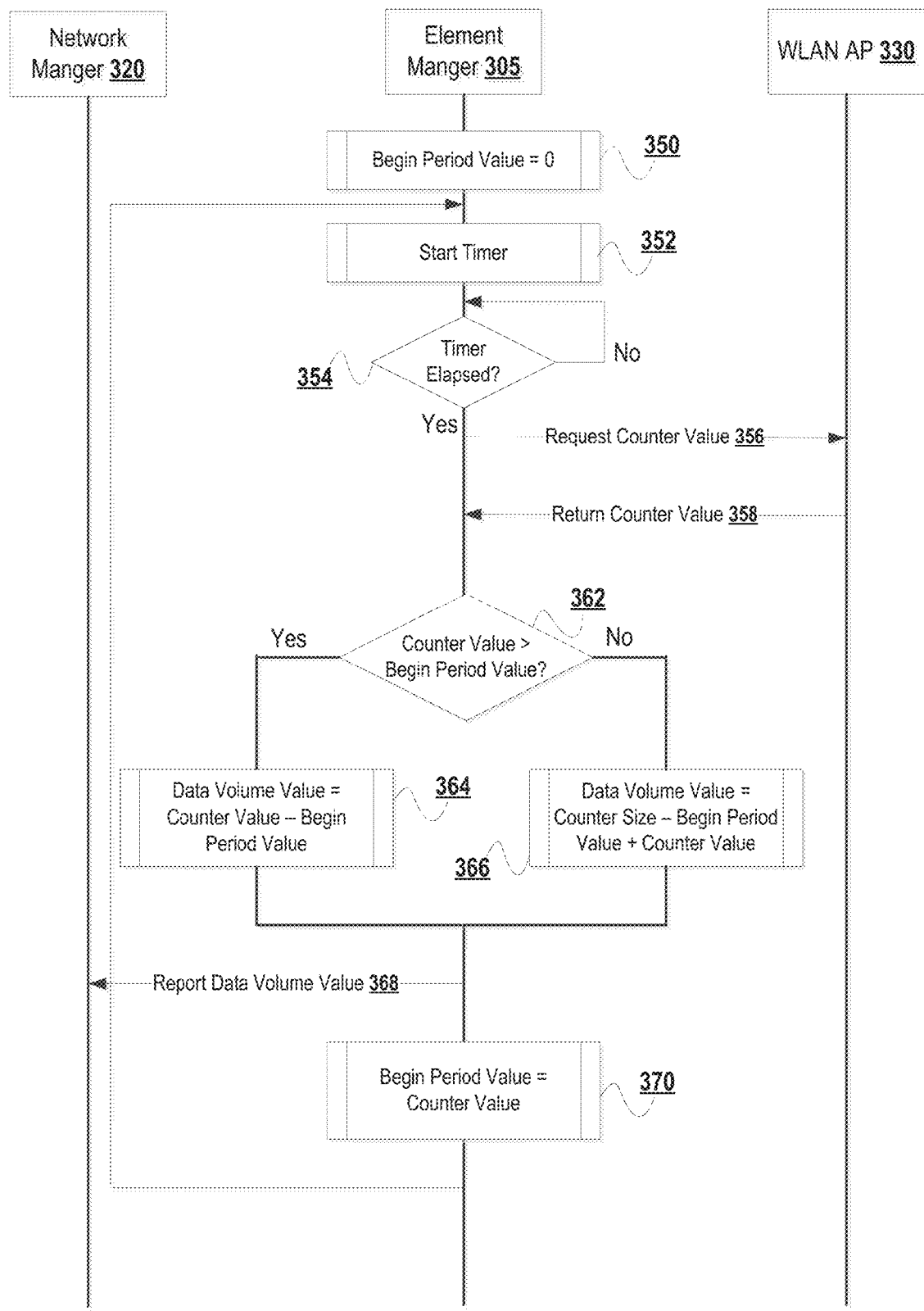
FIG. 3 is a sequence diagram illustrating systems and operations for computing a data volume value based on a plurality of counter values from a WLAN access point, in accordance with various embodiments.

With respect to FIG. 3, a sequence diagram illustrates systems and operations for computing a data volume value based on a plurality of counter values from a WLAN AP 330, in accordance with various embodiments. The element manager 305 may be an embodiment of the element manager 105, the network manager 320 may be an embodiment of the network manager 120, and/or the WLAN AP 330 may be an embodiment of one of the WLAN APs 130-135 of FIG. 1.

Initially, the element manager 305 may set a begin period value to 0, such as by setting and/or initializing a data structure in storage circuitry of the element manager 305 (operation 350). The element manager 305 may start a timer, which may be a duration of a granularity period (operation 352). Subsequently, the element manager 305 is to determine if the timer has elapsed (operation 354). After the element manager 305 detects that the timer has elapsed, the element manager 305 may send a request to the WLAN AP 330 for a value of a counter (operation 356). Responsive to the request, the element manager 305 may receive the value of the counter (operation 358). The element manager 305 may store the received counter value in a data structure.

Thereafter, the element manager 305 may compare the received counter value to the begin period value (operation 362). If the received counter value is greater than the begin period value (e.g., during a first iteration through operations 350-370), then the element manager may set a data volume value to the difference of the received counter value minus the begin value (operation 364). The element manager 305 may store the data volume value in a data structure.

If the element manager 305 determines that the received counter value is less than or equal to the begin period value, then the element manager 305 may set a data volume value to a difference of the size of the counter from which the value was requested minus the begin period value plus the end period value (operation 366). The size of the counter from which the value was requested may be a value stored in a data structure in storage circuitry of the element manager 305 and/or received by the element manager 305 (e.g., from the WLAN AP 330 responsive to a request).

Subsequently, the element manager 305 may report the data volume value to the network manager 320 (operation 368). The element manager 305 may then store the begin period value to the receive counter value in a data structure for additional iterations through various operations (operation 370). The element manager 305 may then restart the timer to read an additional counter value for a next granularity period (return to operation 352).

While a comparison of the received counter value to the begin period value may be unnecessary for a first iteration through operations for the element manager 305 (e.g., the received counter value will likely be greater than 0), setting the begin period value to the received counter value and comparing that set begin period value to a next received counter value may be necessary to obtain an accurate data volume value to report to the network manager 320. As the timer (e.g., granularity period) may be of a duration that allows the counter at the WLAN AP 330 to exceed its size and return to zero (i.e., wrap around), the comparison of the received counter value to the begin period value (e.g., a previous counter value) may account for this scenario.

In some embodiments, a counter at the WLAN AP 330 may be thirty-two (32) bits (e.g., ifInOctets or ifOutOctets). If the timer (e.g., granularity period) is of a duration (e.g., 900 seconds) and the connection between the element manager 305 and the WLAN AP 330 is sufficiently fast (e.g., greater than 4.772 megabytes per second), the counter may wrap around twice and, therefore, cause the element manager 305 to compute a data volume value that does not reflect an accurate measurement. To prevent this issue, a similar or equivalent counter at the WLAN AP 330 that is sixty-four (64) bits, instead of 32 bits, may be used. For example, ifHCInOctets and ifHCOutOctets may be used in place of ifInOctets and ifOutOctets, respectively, as ifHCInOctets and ifHCOutOctets count the same events as ifInOctets and ifOutOctets, respectively, but with a 64-bit size instead of 32-bit. The IF-MIB associated with IETF RFC 2863 may define these high-capacity counter objects (e.g., ifHCInOctets and ifHCOutOctets) as 64-bit versions of the "basic" ifTable counters. The high-capacity objects (e.g., ifHCInOctets and ifHCOutOctets) may have the same basic semantics as lower-capacity counterparts (e.g., ifInOctets and ifOutOctets); however, the syntax of the high-capacity objects may be extended to 64 bits. IF-MIB associated with IETF RFC 2863 may define two exemplary high-capacity counters:

```
ifHCInOctets OBJECT-TYPE
    SYNTAX Counter64
    MAX-ACCESS read-only
    STATUS current
    DESCRIPTION
        "The total number of octets received on the interface,
        including framing characters. This object is a 64-bit
        version of ifInOctets.
        Discontinuities in the value of this counter can occur at
        re-initialization of the management system, and at other
        times as indicated by the value of
        ifCounterDiscontinuityTime."
    ::= { ifXEntry 6 }
ifHCOutOctets OBJECT-TYPE
    SYNTAX Counter64
    MAX-ACCESS read-only
    STATUS current
    DESCRIPTION
        "The total number of octets transmitted out of the interface,
        including framing characters. This object is a 64-bit
        version of ifOutOctets.
        Discontinuities in the value of this counter can occur at
        re-initialization of the management system, and at other
        times as indicated by the value of
        ifCounterDiscontinuityTime."
```

Figure 4:
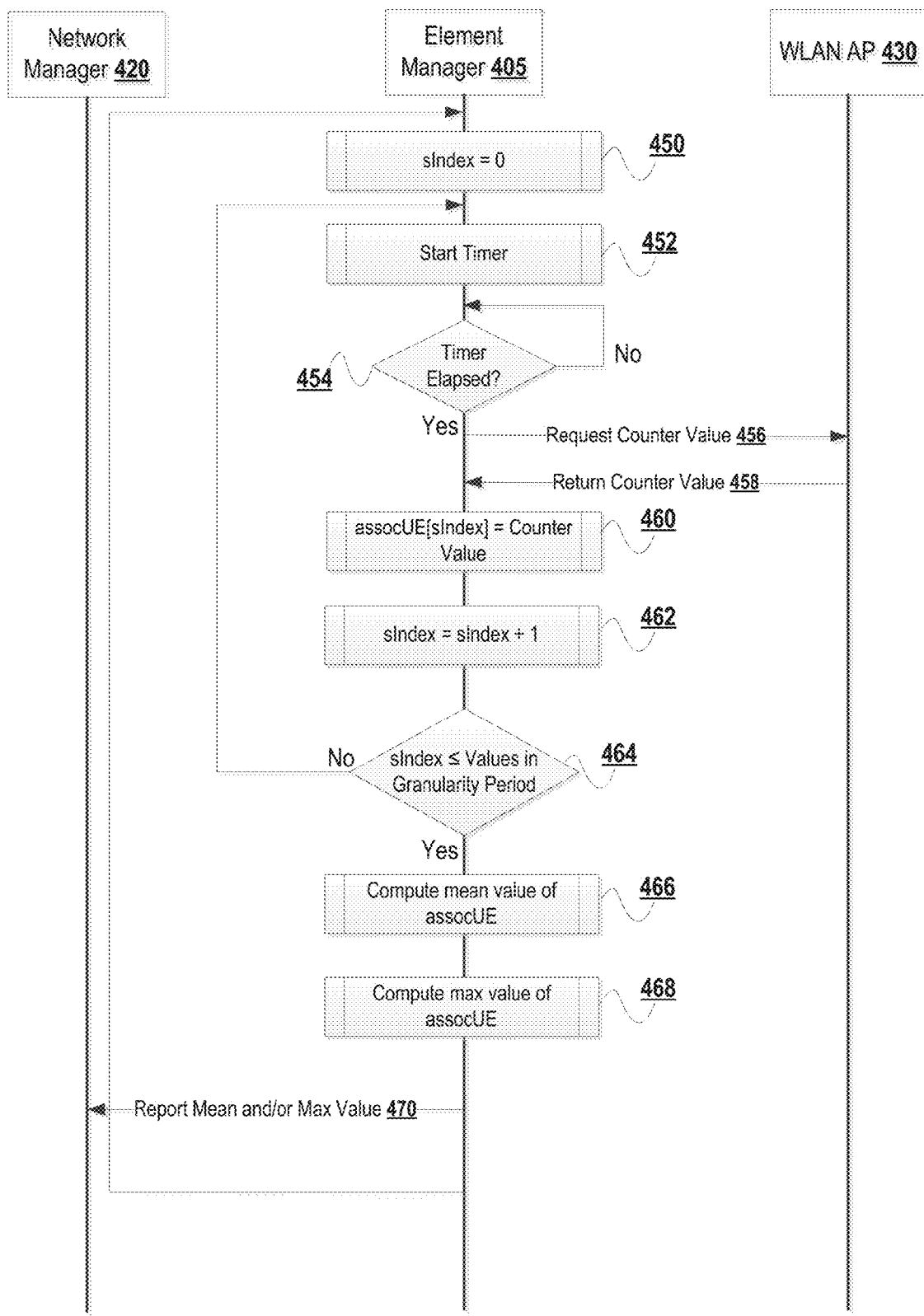
FIG. 4 is a sequence diagram illustrating systems and operations for computing user equipment association-related values based on a plurality of counter values from a WLAN access point, in accordance with various embodiments.

With respect to FIG. 4, a sequence diagram illustrates systems and operations for computing UE association-related values based on a plurality of counter values from a WLAN AP 430, in accordance with various embodiments. The element manager 405 may be an embodiment of the element manager 105, the network manager 420 may be an embodiment of the network manager 120, and/or the WLAN AP 430 may be an embodiment of one of the WLAN APs 130-135 of FIG. 1 and described herein.

The network manager 420 may need to collect UE association-related values (e.g., mean and maximum values of UE association or failed association) from one or more counters at the WLAN AP 430. The network manager 420 may be configured to collect UE association-related values via a status-inspection approach over an Itf-N. However, the one or more counters at the WLAN AP 430 may not be configured to support a status inspection approach (e.g., the counters may simply increment and/or decrement without any other computation, such as computation of mean or maximum values). For example, dot11AssociatedStationCount is an SNMP counter that does not support status inspection. Therefore, the element manager 405 may be configured to sample, at a predetermined interval, the one or more counters (e.g., one or more SNMP counters) and to compute UE association-related values, such as the mean and maximum values of UEs associated with the WLAN AP 430 for predetermined intervals comprising a granularity period. While the element manager 405 is illustrated in FIG. 4 as computing mean values and maximum values of UEs that are associated with the WLAN AP 430 or failed an attempt to associate with the WLAN AP 430, the element manager 405 may be configured to compute one or more other values (e.g., a minimum, a median, a mode, etc.) instead of or in addition to the mean and maximum values.

Initially, the element manager 405 may set a sampling index to an initial value, such as 0, by setting and/or defining a data structure in storage circuitry of the element manager 405 (operation 450). In embodiments, the sampling index may correspond to a number of values that have been read from one or more counters of the WLAN AP 430. For example, the sampling index may be an index associated with one or more data structures in which values of one or more counters from the WLAN AP 430 are to be stored at the element manager 405, such as an index for an array, vector, list, or other indexed or keyed data structure.

The element manager 405 may start a timer (operation 452). Subsequently, the element manager 405 is to determine if the timer has elapsed (operation 454). After the element manager 405 detects that the timer has elapsed, the element manager 405 may send a request to the WLAN AP 430 for a value of a counter (operation 456). Responsive to the request, the element manager 405 may receive the value of the counter (operation 458). The element manager 405 may store the received counter value in a data structure based on the sampling index (e.g., the first counter value may be stored in a first location based on the initial value of the sampling index) (operation 460).

Thereafter, the element manager 405 may adjust the value of the sampling index to another value, such as by incrementing the sampling index (operation 462). The element manager 405 may then compare the sampling index to a predefined value, such as the number of values that are to be sampled in a granularity period (operation 464). If the sampling index is less than or equal to that predefined value, then the element manager 405 may determine that an insufficient amount of values have been sampled for a granularity period. Therefore, the element manager 405 may restart the timer and read another counter value, which may be stored in a data structure based on the sampling index (operations 452-462).

If the sampling index is greater than the predefined value, then the element manager 405 may determine that a sufficient amount of values have been sampled for a granularity period. Therefore, the element manager 405 may compute the mean value of the plurality of counter values that have been received from the WLAN AP 430 (operation 466). For example, the element manager 405 may compute a mean value of values in a data structure in which the received counter values have been stored. Additionally, the element manager 405 may compute the maximum value of the plurality of counter values that have been received from the WLAN AP 430 (operation 468). For example, the element manager 405 may determine a maximum value of values in a data structure in which the received counter values have been stored.

At operation 470, the element manager 405 may report the computed mean and maximum values to the network manager 420. The element manager 405 may iterate through operations again to compute additional mean and maximum values for a next granularity period, such as by clearing a data structure and/or resetting the sampling index to an initial value (return to operation 450).

Figure 5:
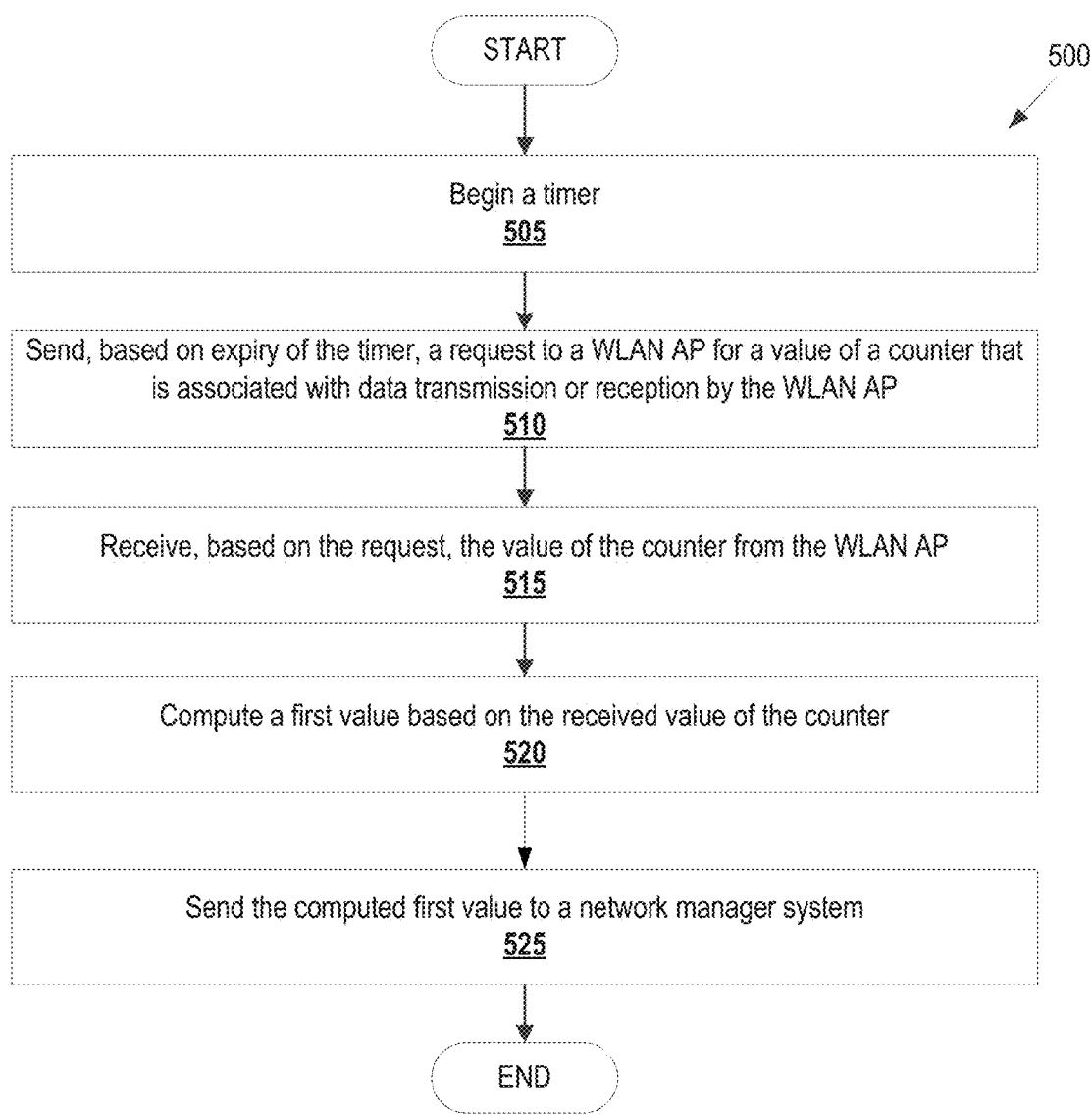
FIG. 5 is a flow diagram illustrating a method for computing a data volume value based on one or more received counter values, in accordance with various embodiments.

In reference to FIG. 5, a flow diagram illustrates a method 500 for computing a data volume value based on one or more received counter values, in accordance with various embodiments. The method 500 may be performed by an element manager, such as the element manager 105 of FIG. 1. While FIG. 5 illustrates a plurality of sequential operations, one of ordinary skill would understand that one or more operations of the method 500 may be transposed and/or performed contemporaneously.

To begin, the method 500 may include operation 505 for beginning a timer. Operation 510 may include sending, based on expiry of the timer, a request to a WLAN AP for a value of a counter that is associated with data transmission or reception by the WLAN AP. Subsequently, operation 515 may include receiving, based on the request, the value of the counter from the WLAN AP. The request and the value may be sent and received, respectively, using SNMP.

At operation 520, the method 500 may include computing a first value (e.g., a data volume value) based on the received value of the counter. In various embodiments, operation 520 may include one or more operations to account for when the size of the counter has been exceeded and/or the counter restarted. For example, operation 520 may include operations associated with comparing the received value to at least one other value (e.g., a previous value of the counter received from the WLAN AP) and computing the first value based on the received value and the at least one other value.

Thereafter, operation 525 may include sending the computed first value to a network manager system. This value may be sent using Itf-N.

Figure 6:
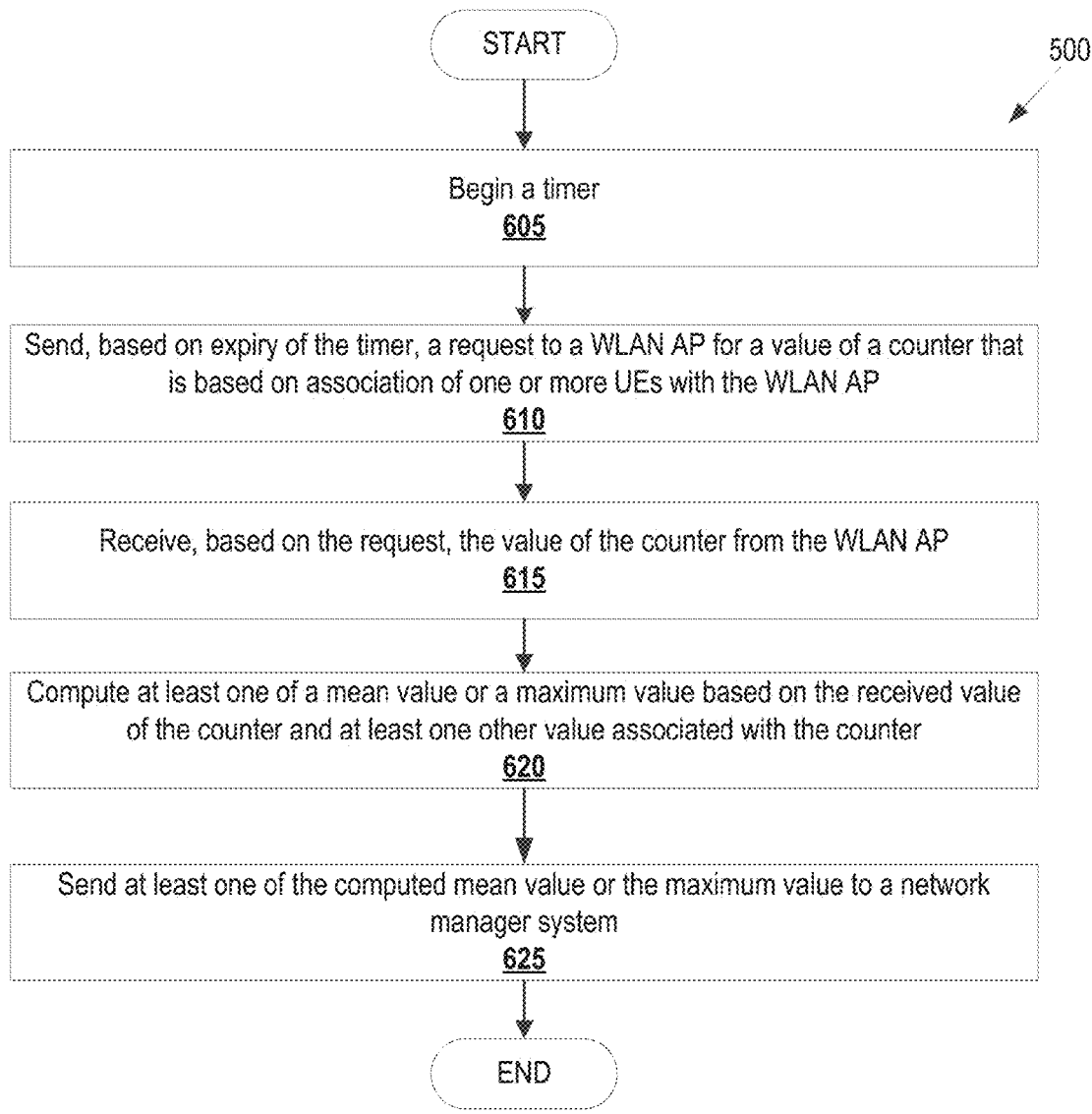
FIG. 6 is a flow diagram illustrating a method for computing at least one of a mean value or a maximum value based on a plurality of received counter values, in accordance with various embodiments.

Turning to FIG. 6, a flow diagram illustrates a method 600 for computing at least one of a mean value or a maximum value based on a plurality of received counter values, in accordance with various embodiments. The method 600 may be performed by an element manager, such as the element manager 105 of FIG. 1. While FIG. 6 illustrates a plurality of sequential operations, one of ordinary skill would understand that one or more operations of the method 600 may be transposed and/or performed contemporaneously.

To begin, the method 600 may include operation 605 for beginning a timer. Operation 610 may include sending, based on expiry of the timer, a request to a WLAN AP for a value of a counter that is based on association of one or more UEs with the WLAN AP. For example, the counter may indicate a number of UEs that are currently associated with the WLAN AP or a number of UEs that have failed (e.g., were denied) association with the WLAN AP. Subsequently, operation 615 may include receiving, based on the request, the value of the counter from the WLAN AP. The request and the value may be sent and received, respectively, using SNMP.

At operation 620, the method 600 may include computing at least one of a mean value or a maximum value based on the received value of the counter and at least one other value (e.g., a previous value of the counter received from the WLAN AP). For example, operation 620 may include computing at least one of a mean value or a maximum value based on the received value of the counter and a plurality of previously received values of the counter. Thereafter, operation 625 may include sending at least one of the computed mean value or maximum value to a network manager system. The at least one of the computed mean value or maximum value may be sent using Itf-N.

Figure 7:
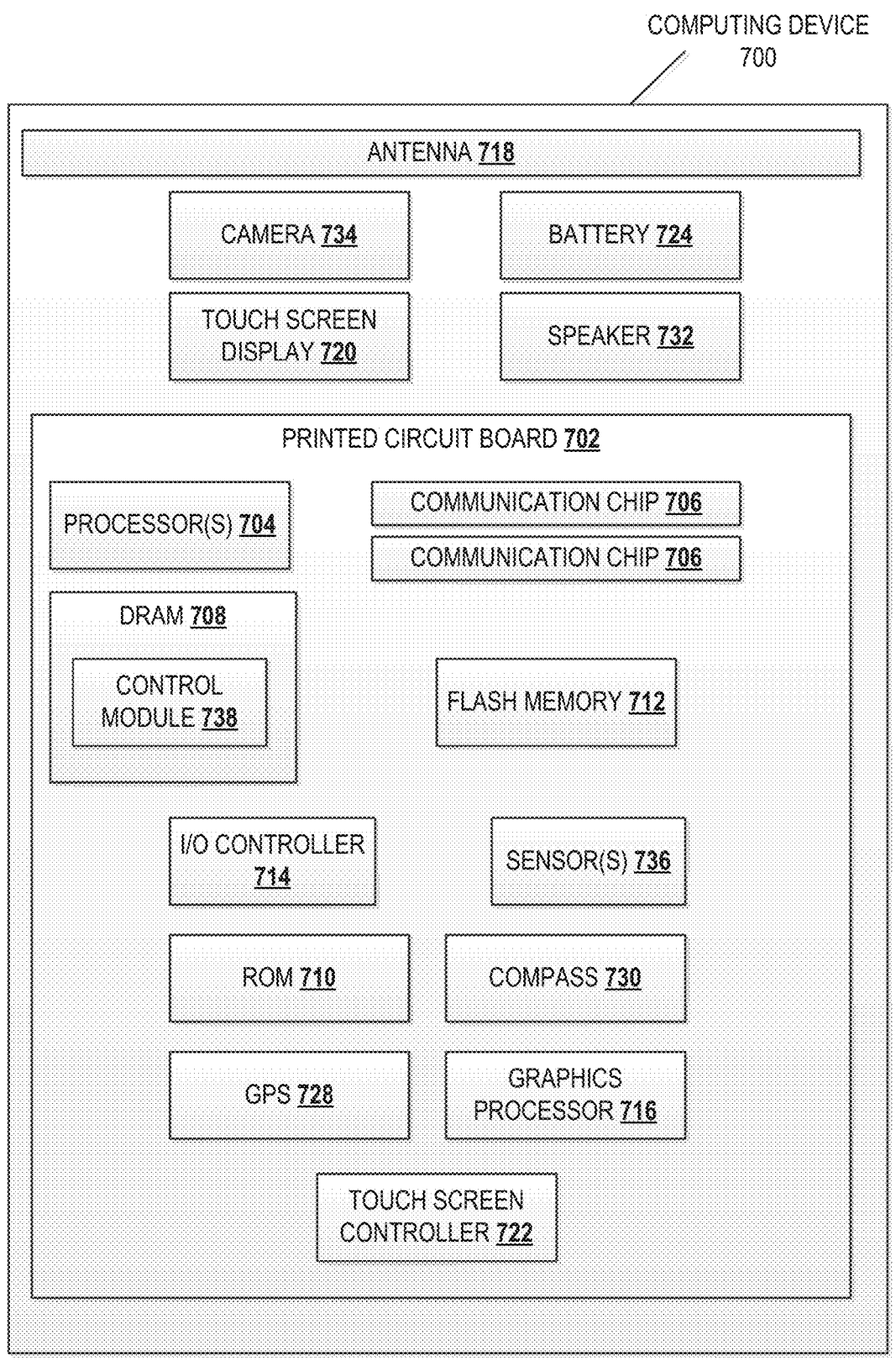
FIG. 7 is a block diagram illustrating a computing device adapted to operate in a communication network, in accordance with various embodiments.

Now with reference to FIG. 7, a block diagram illustrates an example computing device 700, in accordance with various embodiments. The element manager 105 and/or one of the WLAN APs 130-135 of FIG. 1 and/or the network manager 220 of FIG. 2 and described herein may be implemented on a computing device such as computing device 700. Further, the computing device 700 may be adapted to perform one or more operations of the method 500 described with respect to FIG. 5 and/or the method 600 described with respect to FIG. 6. The computing device 700 may include a number of components, including one or more processors 704, and one or more communication chips 706. Depending upon the embodiment, one or more of the enumerated components may comprise "circuitry" of the computing device 700, such as processing circuitry, communication circuitry, and the like. In various embodiments, the one or more processor(s) 704 each may be a processor core. In various embodiments, the one or more communication chips 706 may be physically and electrically coupled with the one or more processor(s) 704. In further implementations, the communication chips 706 may be part of the one or more processor(s) 704. In various embodiments, the computing device 700 may include a printed circuit board (PCB) 702. For these embodiments, the one or more processor(s) 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global navigation satellite system 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 704 may be integrated on the same die with other components to form a system on a chip (SOC).

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processor(s) 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processor(s) 704, enable the computing device 700 to operate one or more modules (e.g., control module 738) configured to practice all or selected aspects of the data exchanges and method described herein, depending on the embodiment of the computing device 700 used to implement such data exchanges and methods.

The communication chips 706 may enable wired and/or wireless communication for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to LTE, LTE-A, Institute of Electrical and Electronics Engineers (IEEE) 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data Rates for GSM Evolution (EDGE), Code Division Multiple Access (CDMA), Time Division Multiple Access (TDMA), Digital Enhanced Cordless Telecommunications (DECT), Bluetooth, derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as Wi-Fi and Bluetooth, whereas a second communication chip 706 may be dedicated to longer range wireless communications, such as GPS, EDGE, GPRS, CDMA, WiMAX, LTE, LTE-A, Ev-DO, and the like.

Figure 8:
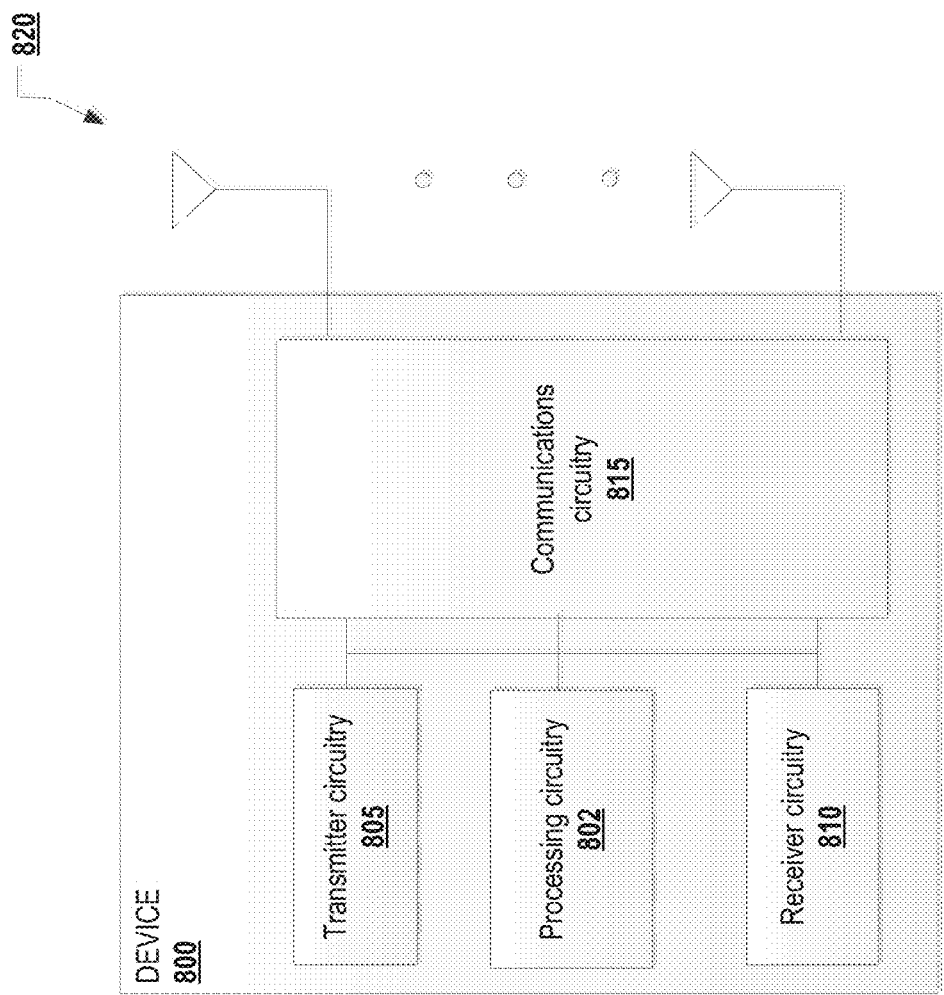
FIG. 8 is a block diagram illustrating a transmitting and receiving device, in accordance with various embodiments.

FIG. 8 illustrates a device 800 in accordance with some embodiments. The device 800 may be similar to and/or included in one or more of the element manager 105 and/or one of the WLAN APs 130-135 of FIG. 1 and/or the network manager 220 of FIG. 2 and described herein. The device 800 may include processing circuitry 802, transmitter circuitry 805, receiver circuitry 810, communications circuitry 815, and one or more antennas 820 coupled with each other at least as shown.

Briefly, the communications circuitry 815 may be coupled with the antennas 820 to facilitate over-the-air communication of signals to/from the device 800. Operations of the communications circuitry 815 may include, but are not limited to, filtering, amplifying, storing, modulating, demodulating, transforming, etc.

The transmitter circuitry 805 may be coupled with the communications circuitry 815 and may be configured to provide signals to the communications circuitry 815 for transmission by the antennas 820. In various embodiments, the transmitter circuitry 805 may be configured to provide various signal processing operations on the signal to provide the signal to the communications circuitry 815 with appropriate characteristics. In some embodiments, the transmitter circuitry 805 may be adapted to generate signals. Further, the transmitter circuitry 805 may be adapted to scramble, multiplex, and/or modulate various signals prior to transmission by the communications circuitry 815.

The receiver circuitry 810 may be coupled with the communications circuitry 815 and may be configured to receive signals from the communications circuitry 815. In some embodiments, the receiver circuitry 810 may be adapted to generate signals. Further, the receiver circuitry 810 may be adapted to descramble, de-multiplex, and/or demodulate various signals following reception by the communications circuitry 815.

The processing circuitry 802 may be coupled with the transmitter circuitry 805, the receiver circuitry 810, and/or the communications circuitry 815. The processing circuitry may be adapted to perform operations described herein with respect to an element manager, a network manager, and/or a WLAN AP. In some embodiments, the processing circuitry 802 may be adapted to generate, process, and/or manipulate data that is to be transmitted over the air or over an electrical connection (e.g., a network), e.g., to and/or from an element manager, a network manager, and/or a WLAN AP.

Some or all of the communications circuitry 815, transmitter circuitry 805, and/or receiver circuitry 810 may be included in, for example, a communication chip and/or communicatively coupled with a printed circuit board as described with respect to FIG. 7.

In various embodiments, example 1 may be an element manager comprising: storage circuitry to store a first value and a second value associated with data volume; a timer that is to elapse after a predefined period; and an integration reference point agent, coupled with the timer and the storage circuitry, to: begin the timer, detect that the timer has elapsed, read, based on the detection that the timer has elapsed, a value of a counter associated with data transmission or reception by a wireless local area network access point, compare the value of the counter to the second value, and update the first value based on the comparison of the value of the counter to the second value. Example 2 may be the element manager of example 1, wherein the counter is associated with an internet protocol layer of the wireless local area network access point. Example 3 may be the element manager of example 2, wherein the counter is to indicate a number of incoming internet protocol packets received at the wireless local area network access point, a number of outgoing internet protocol packets transmitted by the wireless access point, a number of octets of incoming internet protocol packets received at the wireless local area network access point, or a number of octets of outgoing internet protocol packets transmitted by the wireless local area network access point. Example 4 may be the element manager of example 1, wherein the counter is associated with a media access control layer of the wireless local area network access point. Example 5 may be the element manager of example 4, wherein the counter is to indicate a number of incoming media access control protocol data units received at the wireless local area network access point or a number of outgoing media access control protocol data units transmitted by the wireless local area network access point. Example 6 may be the element manager of any of examples 1-5, wherein the integration reference point agent is to read the value of the counter via transmission, to the wireless local area network access point, of a request for the value of the counter and reception, from the wireless local area network access point, of the value of the counter. Example 7 may be the element manager of any of examples 1-5, wherein the second value is a previous value of the counter obtained by the integration reference point agent before the integration reference point agent begins the timer. Example 8 may be the element manager of any of examples 1-5, wherein the integration reference point agent is to cause the first value to be transmitted to a network manager having an integration reference point manager. Example 9 may be the element manager of example 8, further comprising: a network interface, coupled with the integration reference point agent, to transmit the first value to the network manager.

In various embodiments, example 10 may be an element manager comprising: storage circuitry having a data structure to store a plurality of values; a timer that is to elapse after a predefined period; and an integration reference point agent, coupled with the timer and the storage circuitry, to: begin the timer, detect that the timer has elapsed, read, based on the detection that the timer has elapsed, a value of a counter that is based on association of user equipment with a wireless local area network access point, store a first value in the data structure of the storage circuitry based on the value of the counter, compute at least one of a mean value or a maximum value based on the values stored in the data structure. Example 11 may be the element manager of example 10, wherein the counter is to indicate a number of user equipment that are associated with the wireless local area network access point. Example 12 may be the element manager of example 10, wherein the counter is to indicate a number of user equipment that failed to associate with the wireless local area network access point. Example 13 may be the element manager of example 10, wherein the integration reference point agent is to read the value of the counter via transmission, to the wireless local area network access point, of a request for the value of the counter and reception, from the wireless local area network access point, of the value of the counter. Example 14 may be the element manager of example 13, wherein the integration reference point agent is to cause the request to be transmitted via simple network management protocol. Example 15 may be the element manager of any of examples 10-14, wherein the integration reference point agent is further to: restart the timer, detect that the restarted timer has elapsed, read, based on the detection that the restarted timer has elapsed, another value of the counter, store a second value in the data structure of the storage circuitry based on the other value of the counter. Example 16 may be the element manager of any of examples 10-14, wherein the integration reference point agent is to cause the at least one of the mean value or the maximum value to be transmitted to a network manager having an integration reference point manager. Example 17 may be the element manager of example 16, further comprising: a network interface, coupled with the integration reference point agent, to transmit the at least one of the mean value or the maximum value to the network manager. Example 18 may be the element manager of example 16, wherein the integration reference point agent is to clear the values stored in the data structure based on transmission of the at least one of the mean value or the maximum value to the network manager.

In various embodiments, example 19 may be one or more non-transitory computer-readable media comprising executable instructions, wherein the instructions, in response to execution by a computing system, cause the computing system to: begin a timer; send, based on expiry of the timer, a request to a wireless local area network access point for a value of a counter associated with data transmission or reception by the wireless local area network access point; receive, based on the request, the value of the counter from the wireless local area network access point; and send a first value to a network manager system based on the received value of the counter. Example 20 may be the one or more non-transitory computer-readable media of example 19, wherein the instructions further cause the computing system to: compare the value of the counter to a previous value of the counter; compute the first value based on the comparison of the value of the counter to a previous value of the counter. Example 21 may be the one or more non-transitory computer-readable media of any of examples 19-20, wherein the counter is associated with an internet protocol layer or a media access control layer of the wireless local area network access point. Example 22 may be the one or more non-transitory computer-readable media of any of examples 19-20, wherein the request is sent via simple network management protocol.

In various embodiments, example 23 may be one or more non-transitory computer-readable media comprising executable instructions, wherein the instructions, in response to execution by a computing system, cause the computing system to: begin a timer; send, based on expiry of the timer, a request to a wireless local area network access point for a value of a counter that is based on association of user equipment with the wireless local area network access point; receive, based on the request, the value of the counter from the wireless local area network access point; compute at least one of a mean value and a maximum value based on the value of the counter and at least one other value associated with the counter; and send at least one of the mean value or the maximum value to a network manager system. Example 24 may be the one or more non-transitory computer-readable media of example 23, wherein the counter is to indicate a number of user equipment that are associated with the wireless local area network access point or a number of user equipment that failed to associate with the wireless local area network access point. Example 25 may be the one or more non-transitory computer-readable media of any of examples 23-24, wherein the request is sent via simple network management protocol, and wherein the at least one of the mean value or the maximum value is sent to the network manager system via an Itf-N interface.

In various embodiments, example 26 may be a method comprising: beginning a timer; detecting that the timer has elapsed; reading, based on the detecting that the timer has elapsed, a value of a counter associated with data transmission or reception by a wireless local area network access point; comparing the value of the counter to a second value; and updating the first value based on the comparing of the value of the counter to the second value. Example 27 may be the method of example 26, wherein the counter is associated with an internet protocol layer of the wireless local area network access point. Example 28 may include the method of example 27, wherein the counter is to indicate a number of incoming internet protocol packets received at the wireless local area network access point, a number of outgoing internet protocol packets transmitted by the wireless access point, a number of octets of incoming internet protocol packets received at the wireless local area network access point, or a number of octets of outgoing internet protocol packets transmitted by the wireless local area network access point. Example 29 may be the method of example 26, wherein the counter is associated with a media access control layer of the wireless local area network access point. Example 30 may be the method of example 29, wherein the counter is to indicate a number of incoming media access control protocol data units received at the wireless local area network access point or a number of outgoing media access control protocol data units transmitted by the wireless local area network access point. Example 31 may be the method of any of examples 26-30, wherein the reading of the value of the counter comprises: transmitting, to the wireless local area network access point, of a request for the value of the counter; and receiving, from the wireless local area network access point, of the value of the counter. Example 32 may be the method of any of examples 26-30, wherein the second value is a previous value of the counter obtained before the beginning of the timer. Example 33 may be the method of any of examples 26-30, further comprising: transmitting the first value to a network manager having an integration reference point manager.

In various embodiments, example 34 may be a method comprising beginning a timer; detecting that the timer has elapsed; reading, based on the detecting that the timer has elapsed, a value of a counter that is based on association of user equipment with a wireless local area network access point; storing a first value in a data structure based on the value of the counter; and computing at least one of a mean value or a maximum value based on values stored in the data structure. Example 35 may be the method of example 34, wherein the counter is to indicate a number of user equipment that are associated with the wireless local area network access point. Example 36 may be the method of example 34, wherein the counter is to indicate a number of user equipment that failed to associate with the wireless local area network access point. Example 37 may be the method of example 34, wherein the reading of the value comprises: transmitting, to the wireless local area network access point, of a request for the value of the counter; and receiving, from the wireless local area network access point, of the value of the counter. Example 38 may be the method of any of examples 34-37, further comprising: restarting the timer; detecting that the restarted timer has elapsed; reading, based on the detecting that the restarted timer has elapsed, another value of the counter; and storing a second value in the data structure based on the other value of the counter.

In various embodiments, example 39 may be an apparatus comprising: means for beginning a timer; means for detecting that the timer has elapsed; means for reading, based on the detecting that the timer has elapsed, a value of a counter associated with data transmission or reception by a wireless local area network access point; means for comparing the value of the counter to a second value; and means for updating the first value based on the comparing of the value of the counter to the second value.

In various embodiments, example 40 may be an apparatus comprising: means for beginning a timer; means for detecting that the timer has elapsed; means for reading, based on the detecting that the timer has elapsed, a value of a counter that is based on association of user equipment with a wireless local area network access point; means for storing a first value in a data structure based on the value of the counter; and means for computing at least one of a mean value or a maximum value based on values stored in the data structure.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An element manager disposed in a core network of a cellular network, the element manager comprising:
   storage circuitry to store a first value and a second value associated with data volume;
   a timer that is to elapse after a predefined period; and
   an integration reference point agent of the element manager of the cellular network, coupled with the timer and the storage circuitry, to:
   begin the timer,
   detect that the timer has elapsed,
   transmit, based on the detection that the timer has elapsed, a request to a wireless local area network (WLAN) access point (AP) for a value of a counter that is to indicate a volume of data transmitted or received by the WLAN AP or a number of user equipments (UEs) associated with the WLAN AP,
   receive an indication of the value from the WLAN AP,
   compare the value of the counter to the second value, and
   update the first value based on the comparison of the value of the counter to the second value.

2. The element manager of claim 1, wherein the counter is associated with an internet protocol layer of the wireless local area network access point.

3. The element manager of claim 2, wherein the counter is to indicate a number of incoming internet protocol packets received at the wireless local area network access point, a number of outgoing internet protocol packets transmitted by the wireless access point, a number of octets of incoming internet protocol packets received at the wireless local area network access point, or a number of octets of outgoing internet protocol packets transmitted by the wireless local area network access point.

4. The element manager of claim 1, wherein the counter is associated with a media access control layer of the wireless local area network access point.

5. The element manager of claim 4, wherein the counter is to indicate a number of incoming media access control protocol data units received at the wireless local area network access point or a number of outgoing media access control protocol data units transmitted by the wireless local area network access point.

6. The element manager of claim 1, wherein the second value is a previous value of the counter obtained by the integration reference point agent before the integration reference point agent begins the timer.

7. The element manager of claim 1, wherein the integration reference point agent is to cause the first value to be transmitted to a network manager having an integration reference point manager.

8. The element manager of claim 7, further comprising:
   a network interface, coupled with the integration reference point agent, to transmit the first value to the network manager.

9. An element manager on a network side of a wireless local area network (WLAN) air interface, the element manager comprising:
   storage circuitry having a data structure to store a plurality of values;
   a timer that is to elapse after a predefined period; and
   an integration reference point agent of the element manager of the cellular network, coupled with the timer and the storage circuitry, to:
   begin the timer,
   detect that the timer has elapsed,
   transmit, based on the detection that the timer has elapsed, a request to a WLAN access point (AP) for a value of a counter that is to indicate a volume of data transmitted or received by the WLAN AP or a number of user equipments (UEs) associated with the WLAN AP,
   receive an indication of the value from the WLAN AP, store a first value in the data structure of the storage circuitry based on the value of the counter, and
compute at least one of a mean value or a maximum value based on the values stored in the data structure.

10. The element manager of claim 9, wherein the counter is to indicate a number of user equipment that are associated with the wireless local area network access point.

11. The element manager of claim 9, wherein the counter is to indicate a number of user equipment that failed to associate with the wireless local area network access point.

12. The element manager of claim 9, wherein the integration reference point agent is to cause the request to be transmitted via simple network management protocol.

13. The element manager of claim 9, wherein the integration reference point agent is further to:
restart the timer,
detect that the restarted timer has elapsed,
read, based on the detection that the restarted timer has elapsed, another value of the counter, and
store a second value in the data structure of the storage circuitry based on the other value of the counter.

14. The element manager of claim 9, wherein the integration reference point agent is to cause the at least one of the mean value or the maximum value to be transmitted to a network manager having an integration reference point manager.

15. The element manager of claim 14, further comprising:
a network interface, coupled with the integration reference point agent, to transmit the at least one of the mean value or the maximum value to the network manager.

16. The element manager of claim 14, wherein the integration reference point agent is to clear the values stored in the data structure based on transmission of the at least one of the mean value or the maximum value to the network manager.

17. One or more non-transitory computer-readable media comprising executable instructions, wherein the instructions, in response to execution by a computing system disposed in a core network of a cellular network, cause the computing system to:
begin a timer;
send, based on expiry of the timer, a request to a wireless local area network (WLAN) access point (AP) for a value of a counter that is to indicate a volume of data transmitted or received by the WLAN AP or a number of user equipments (UE) associated with the WLAN AP;
receive, based on the request, the value of the counter from the wireless local area network access point; and
send a first value to a network manager system of the cellular network based on the received value of the counter.

18. The one or more non-transitory computer-readable media of claim 17, wherein the instructions further cause the computing system to:
compare the value of the counter to a previous value of the counter;
compute the first value based on the comparison of the value of the counter to a previous value of the counter.

19. The one or more non-transitory computer-readable media of claim 17, wherein the counter is associated with an internet protocol layer or a media access control layer of the wireless local area network access point.

20. The one or more non-transitory computer-readable media of claim 17, wherein the request is sent via simple network management protocol.

21. One or more non-transitory computer-readable media comprising executable instructions, wherein the instructions, in response to execution by a computing system disposed on a network side of a wireless local area network (WLAN) air interface of a cellular network, cause the computing system to:
begin a timer;
send, based on expiry of the timer, a request to a WLAN access point (AP) for a value of a counter that is to indicate a volume of data transmitted or received by the WLAN AP or a number of user equipments (UE) associated with the WLAN AP;
receive, based on the request, the value of the counter from the wireless local area network access point;
compute at least one of a mean value and a maximum value based on the value of the counter and at least one other value associated with the counter; and
send at least one of the mean value or the maximum value to a network manager system of the cellular network.

22. The one or more non-transitory computer-readable media of claim 21, wherein the counter is to indicate a number of user equipment that are associated with the wireless local area network access point or a number of user equipment that failed to associate with the wireless local area network access point.

23. The one or more non-transitory computer-readable media of claim 21, wherein the request is sent via simple network management protocol, and wherein the at least one of the mean value or the maximum value is sent to the network manager system via an Itf-N interface.

* * * * *